Nov. 8, 1960 J. R. HOPKINS 2,958,984
MACHINES FOR GRINDING GEARS AND SIMILAR PROFILES
Filed Oct. 21, 1957 13 Sheets-Sheet 1
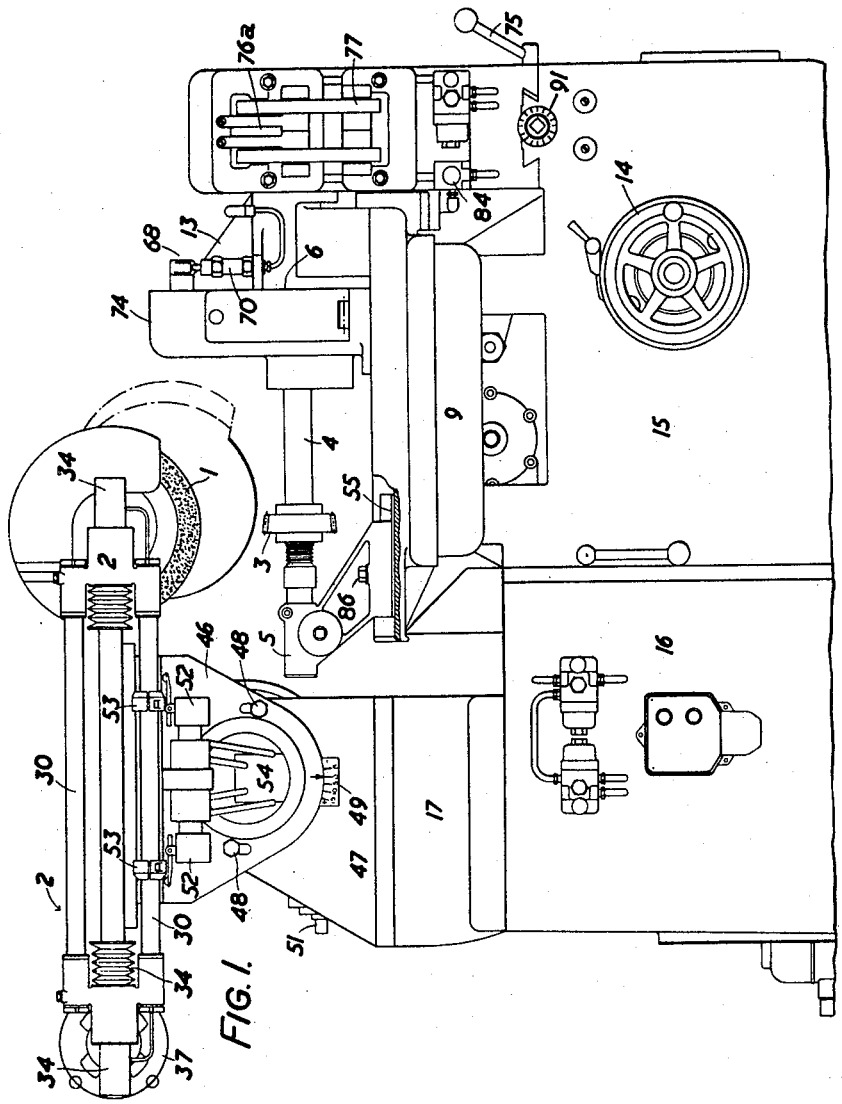
FIG. I.
INVENTOR
Jack R. Hopkins
BY
ATTORNEYS Nov. 8, 1960        J. R. HOPKINS        2,958,984
MACHINES FOR GRINDING GEARS AND SIMILAR PROFILES
Filed Oct. 21, 1957        13 Sheets-Sheet 2
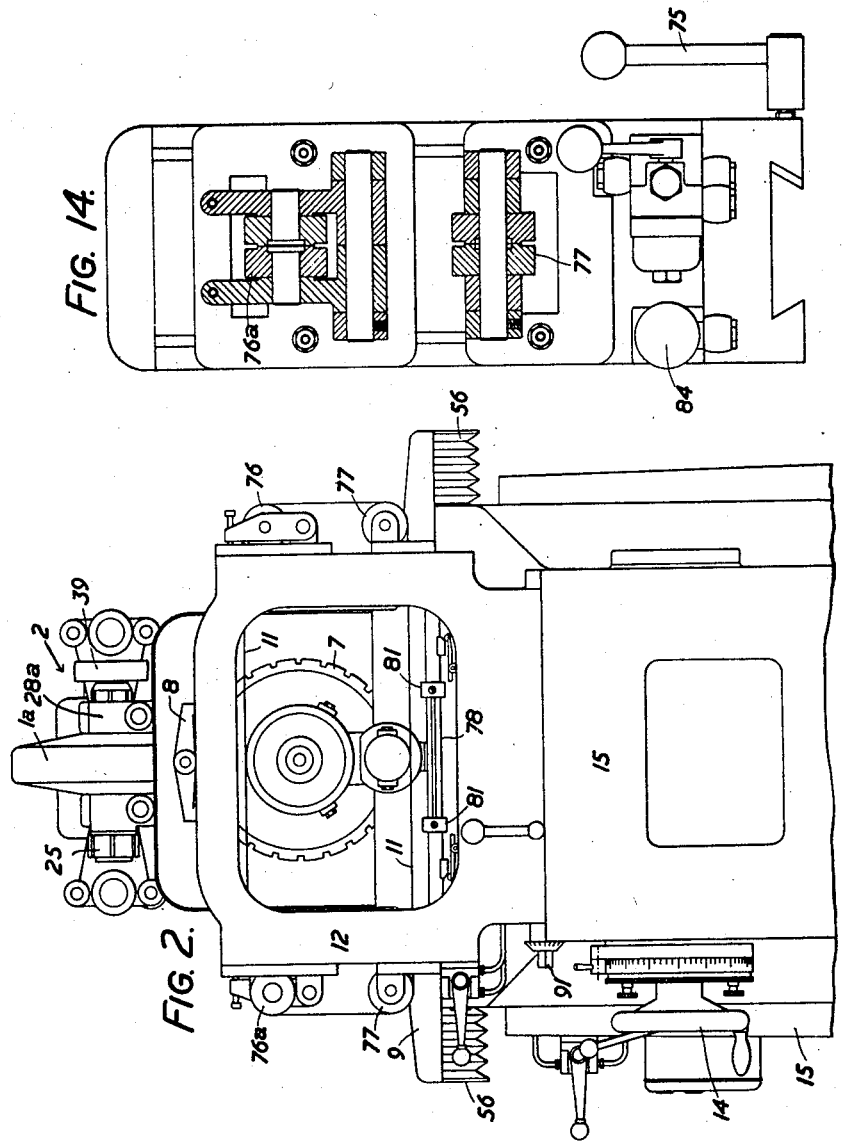
INVENTOR
Jack R. Hopkins
BY
ATTORNEY

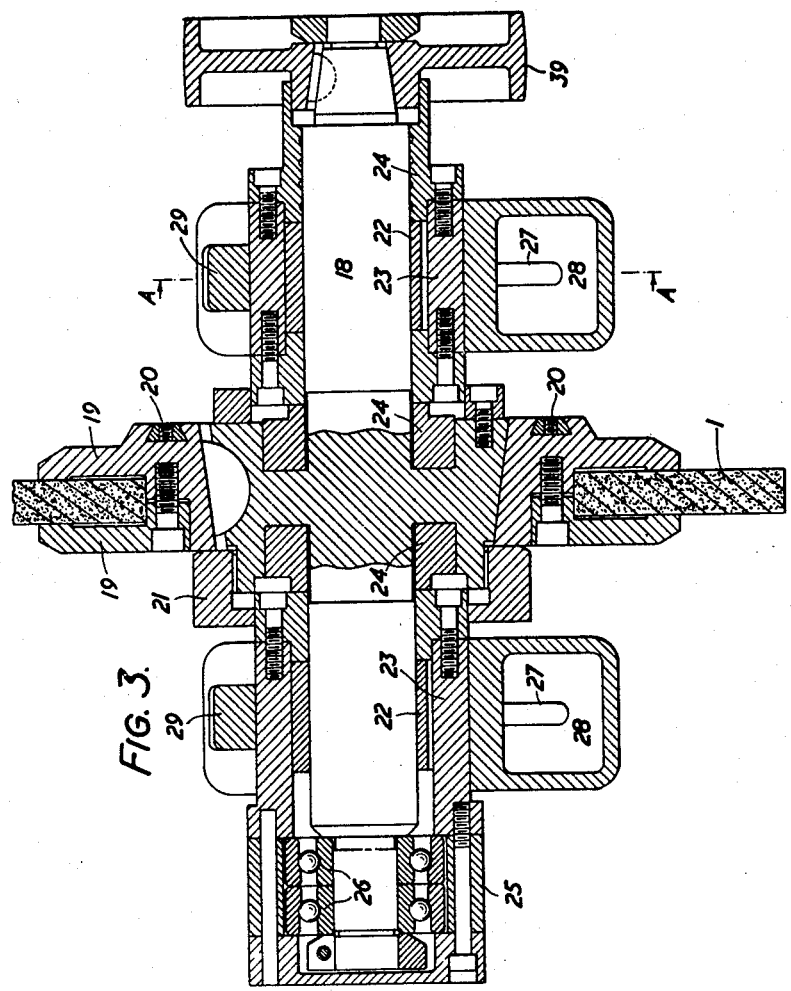

Nov. 8, 1960
J. R. HOPKINS
2,958,984
MACHINES FOR GRINDING GEARS AND SIMILAR PROFILES
Filed Oct. 21, 1957
13 Sheets-Sheet 4
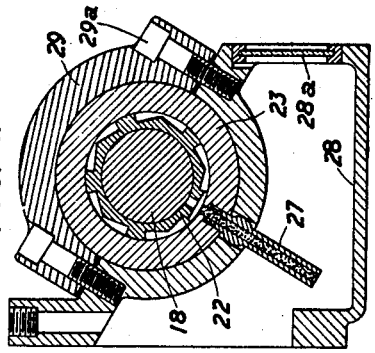
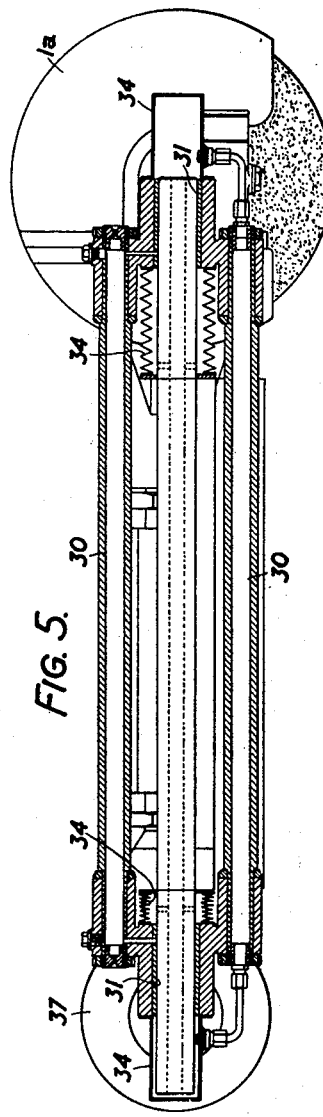
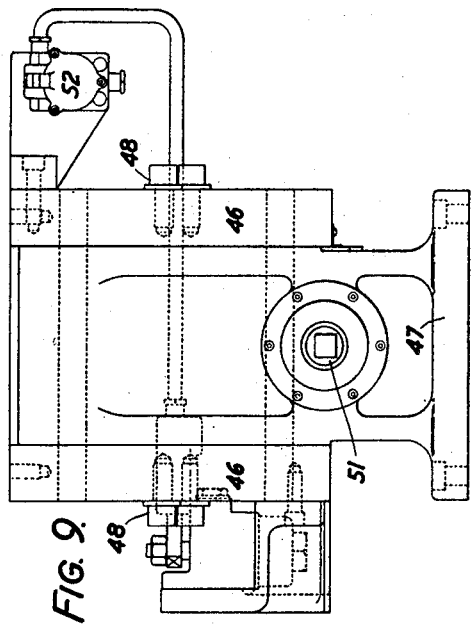
INVENTOR
Jack R. Hopkins
BY
ATTORNEYS Nov. 8, 1960 J. R. HOPKINS 2,958,984
MACHINES FOR GRINDING GEARS AND SIMILAR PROFILES
Filed Oct. 21, 1957 13 Sheets-Sheet 5
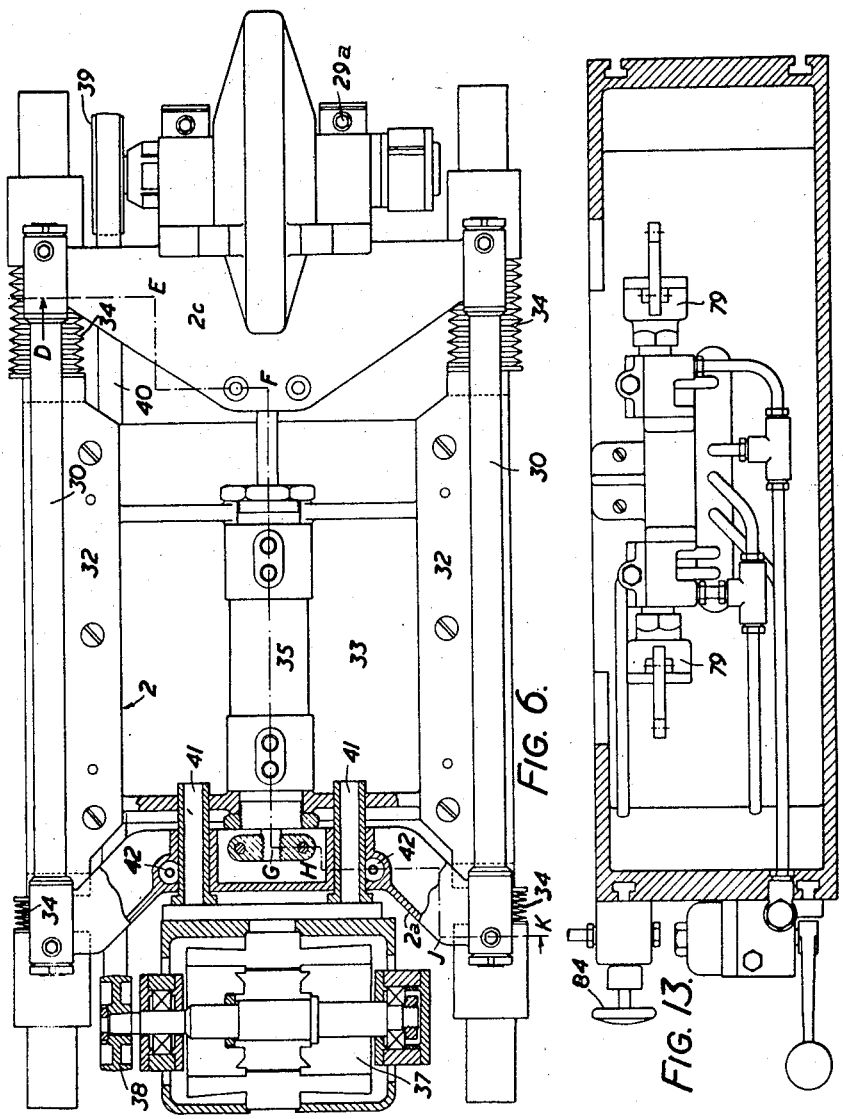
INVENTOR
Jack R. Hopkins
BY
ATTORNEYS

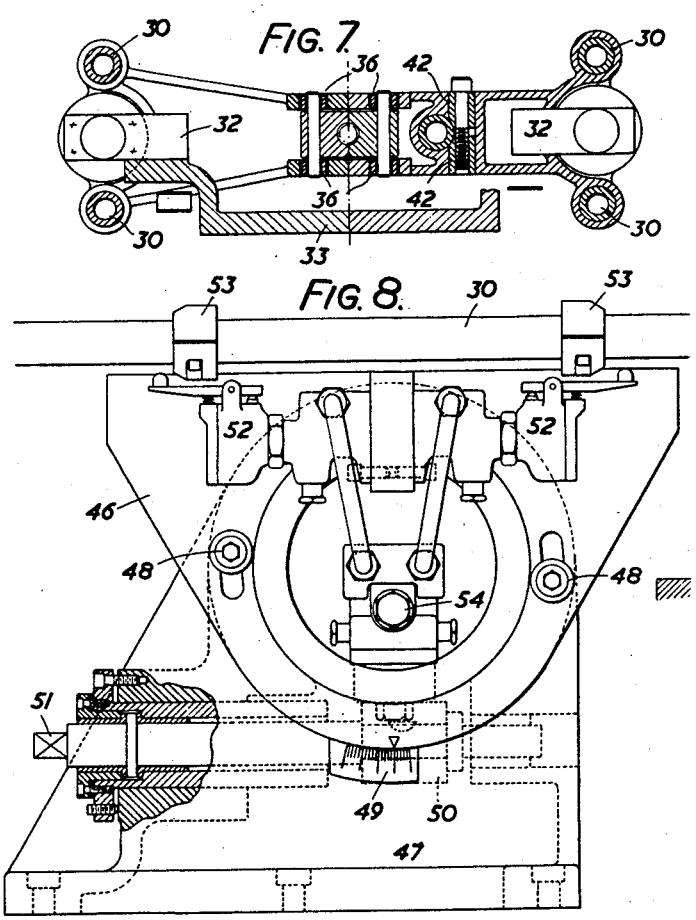

Nov. 8, 1960 J. R. HOPKINS 2,958,984
MACHINES FOR GRINDING GEARS AND SIMILAR PROFILES
Filed Oct. 21, 1957 13 Sheets-Sheet 8

INVENTOR
Jack R. Hopkins
BY
ATTORNEYS

Nov. 8, 1960     J. R. HOPKINS     2,958,984
MACHINES FOR GRINDING GEARS AND SIMILAR PROFILES
Filed Oct. 21, 1957     13 Sheets-Sheet 9
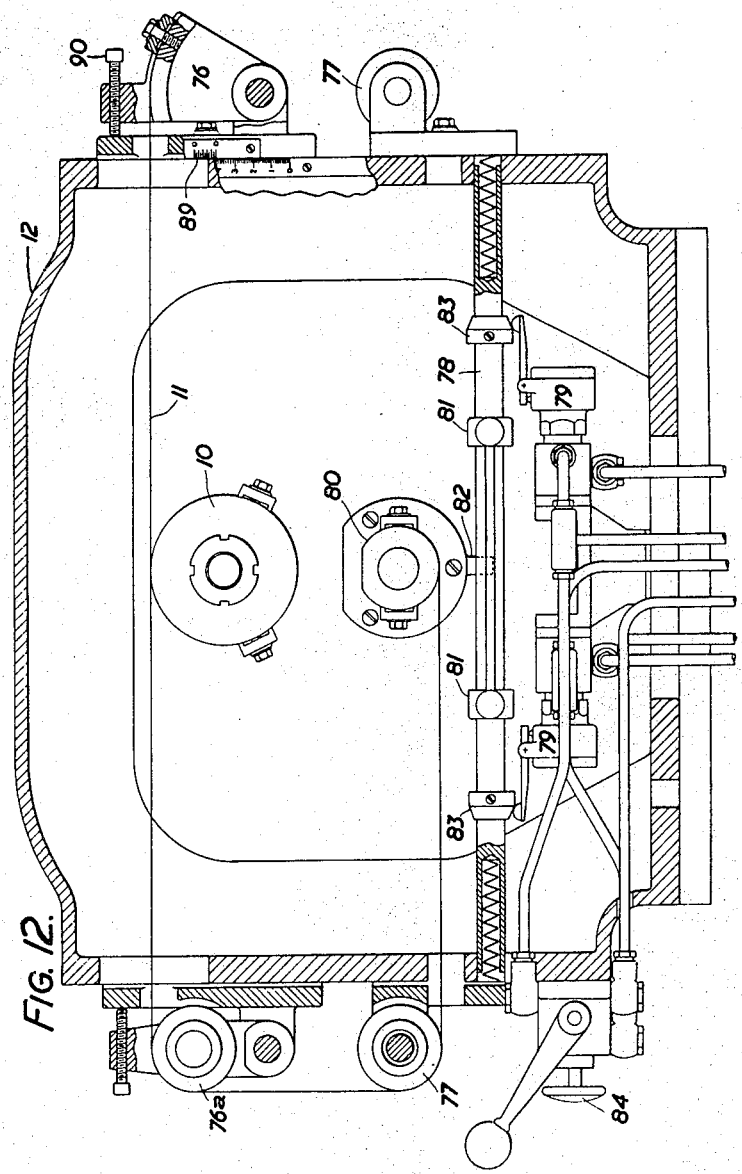
INVENTOR
Jack R. Hopkins
BY
ATTORNEY Nov. 8, 1960  J. R. HOPKINS  2,958,984
MACHINES FOR GRINDING GEARS AND SIMILAR PROFILES
Filed Oct. 21, 1957  13 Sheets-Sheet 11

INVENTOR
Jack R. Hopkins
BY
ATTORNEYS

United States Patent Office 2,958,984
Patented Nov. 8, 1960

2,958,984

MACHINES FOR GRINDING GEARS AND SIMILAR PROFILES

Jack Rowland Hopkins, Wokingham, England, assignor to W. E. Sykes Limited, Staines, England, a British company Filed Oct. 21, 1957, Ser. No. 691,200

Claims priority, application Great Britain Oct. 23, 1956

21 Claims. (Cl. 51—52)

This invention relates to gear cutter grinding machines for the production grinding of spur and helical gear tooth profiles particularly as applied to disc type shaper cutters, shaving tools and master gears.

The object of the invention is to provide an improved machine containing in its units features of lightness and rigidity and capable of operating with a high degree of accuracy, as hereinafter described and as defined in the claims.

According to a feature of the present invention in a metal-grinding machine such as a gear cutter grinding machine a wheelhead assembly arranged to reciprocate with respect to a workpiece is carried by means, such as a cross-slide arranged for traverse at right angles to the plane of the wheel, the workpiece and means serving the function of a divide plate, or the equivalent, being carried on a common mandrel which is mounted between dead centres. Preferably the divide plate is assembled on the mandrel by means which enable accurate registration between the centre of the divide plate and the axis of the mandrel to be achieved and one form of means facilitating such accurate registration consists of an expanding bush disposed in an annular aperture between the divide plate and a divide plate mounting member fitted to the mandrel, the bush being engaged by bolts which pass therethrough into the divide plate mounting member.

In one construction embodying the invention, the divide plate mounting member is a plate having a central tapered bore formed to receive an end of the mandrel which is formed with a corresponding taper, the extremity of the mandrel being screw threaded to receive a lock-nut which secures a divide plate and mounting plate to the mandrel. Position determining means for the divide plate comprise a member shaped releasably to engage and lock in recesses circumferentially spaced around the edge of the divide plate and the positioning means constitute part of a pivoted assembly arranged to impart a rolling motion to the workpiece, mandrel and divide plate assembly about the axis of that assembly. In the particular construction referred to the pivoted assembly pivots with respect to a mounting for one of the centres between which the mandrel is mounted and the pivoted assembly is supported on a bracket on the cross-slide of the machine and is provided with a tape driven drum or pulley which, on traverse of the cross-slide, produces the rolling motion. The grinding wheel assembly includes a slidable mounting incorporating a pneumatic cushioning device arranged to absorb shocks in the longitudinal direction of the slidable mounting.

According to a further feature of the invention the grinding wheelhead assembly is supported on a base member provided with means for fixing the top angle setting and in an alternative construction the base member referred to is provided with means for varying the top angle setting. The base member supporting the grinding wheelhead assembly is mounted to swivel about a vertical axis passing through the plane of the workpiece and in one construction of the machine embodying the invention, the base member is provided with inverted V surfaces which engage corresponding surfaces of an arcuate track on a column supporting the base member. The machine may be provided with a mounting for a motor arranged to drive the grinding wheel via a driving belt or pulley means, or the equivalent, said motor mounting being arranged to traverse an arcuate track concentric with the arcuate track on the column.

According to a further feature of the invention, the grinding wheelhead assembly is carried by a slidable mounting arranged to reciprocate by pneumatic means, the mounting being provided with means serving automatically to change the direction of motion of the mounting. The machine is constructed so that during operation the mounting reciprocates continuously and on cessation of the supply of working air, the mounting is traversed to the wheel dressing position.

According to a further feature of the invention, the cross-slide is traversed pneumatically across the plane of the grinding wheel and means are provided to ensure that the cross-slide cannot traverse unless the divide plate is locked in position. Means are provided to ensure that the locking means for the divide plate cannot be released during traverse of the cross-slide or reciprocation of the grinding wheelhead assembly.

According to a further feature of the invention, hydro-pneumatic means are provided to control the traverse of the cross-slide and preferably, steady traverse of the cross-slide is produced by providing a regulated flow of liquid opposing an air flow which drives the cross-slide or a regulated air flow may be opposed to a liquid flow.

According to a further feature of the invention, a saddle member supporting the cross-slide and grinding wheelhead assembly is raised and lowered with respect to the work by mechanical means and the weight of the saddle and parts carried thereby is substantially balanced pneumatically.

A machine embodying the features of the invention will now be described in greater detail by way of example with reference to the accompanying drawings in which:

Figure 1 is a front elevation of the complete machine,

Figure 2 is a side elevation,

Figure 3 is an elevation in cross section of the grinding wheel assembly,

Figure 4 is a section on the line A—A of Figure 3,

Figure 10:
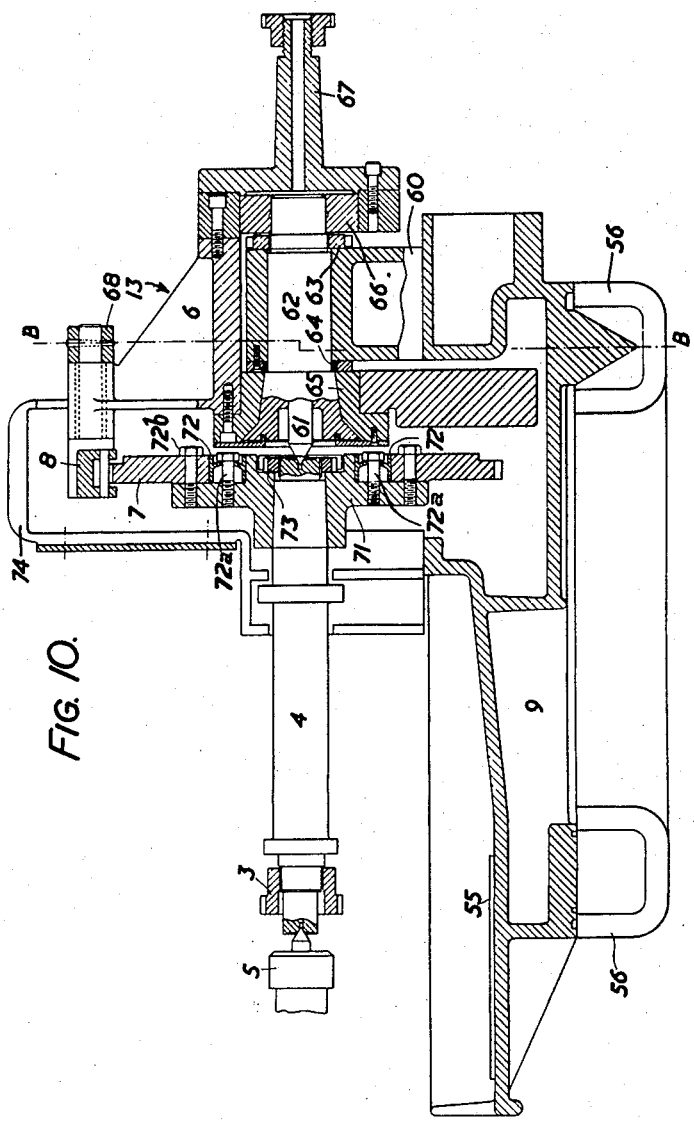
Figure 11:
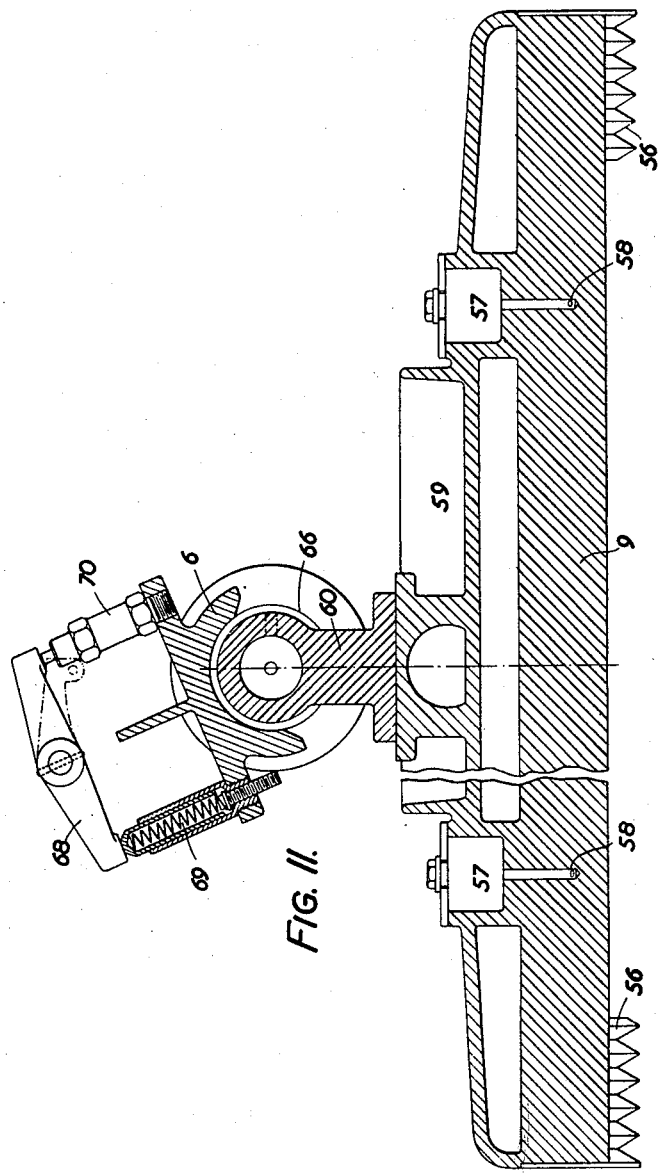
Figure 15:
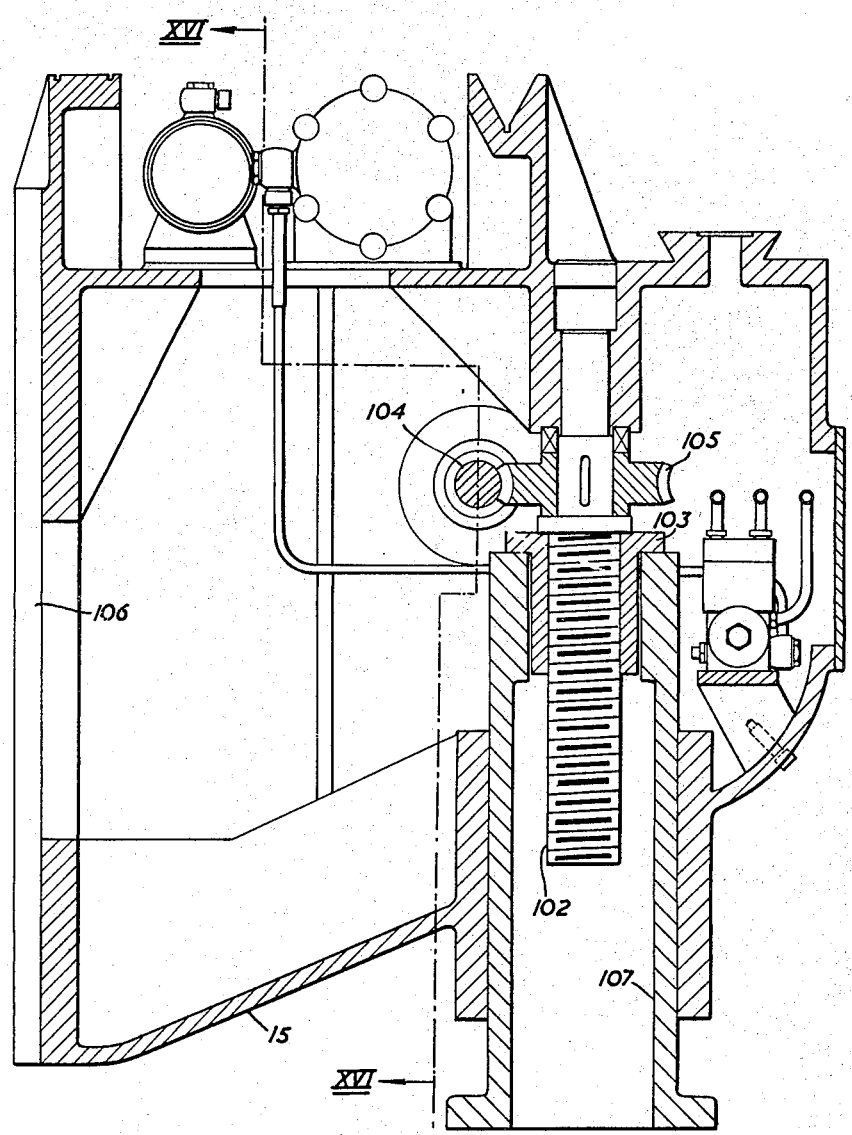
Figure 16:
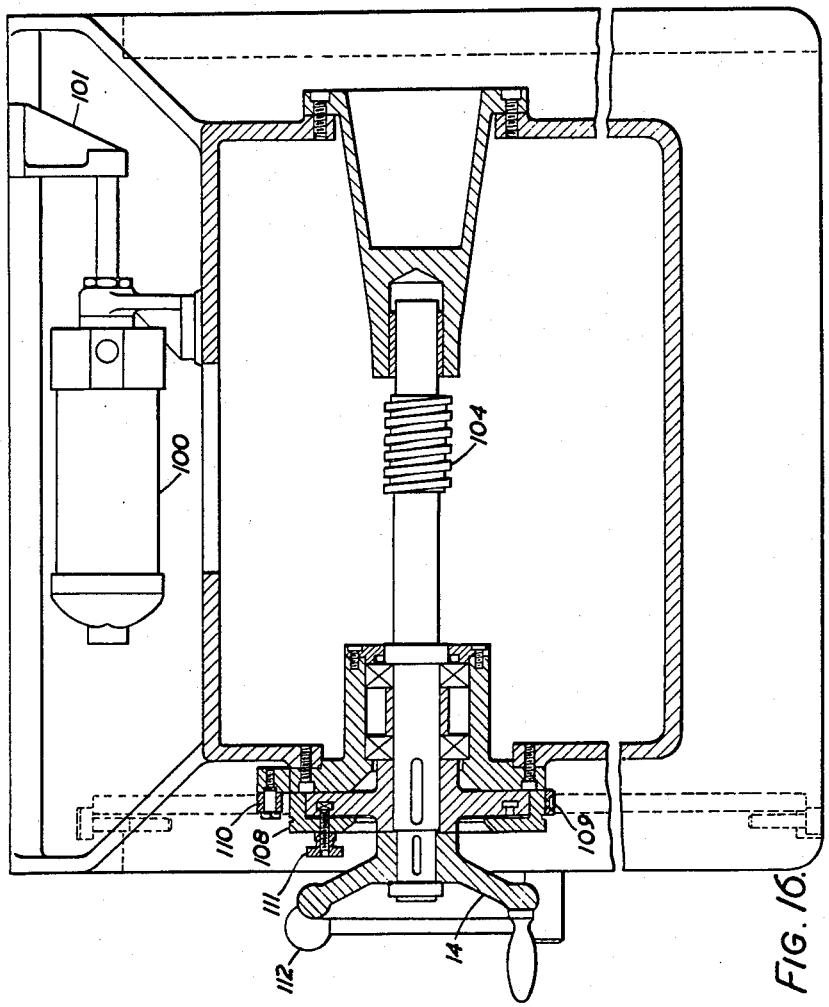
Figure 17:
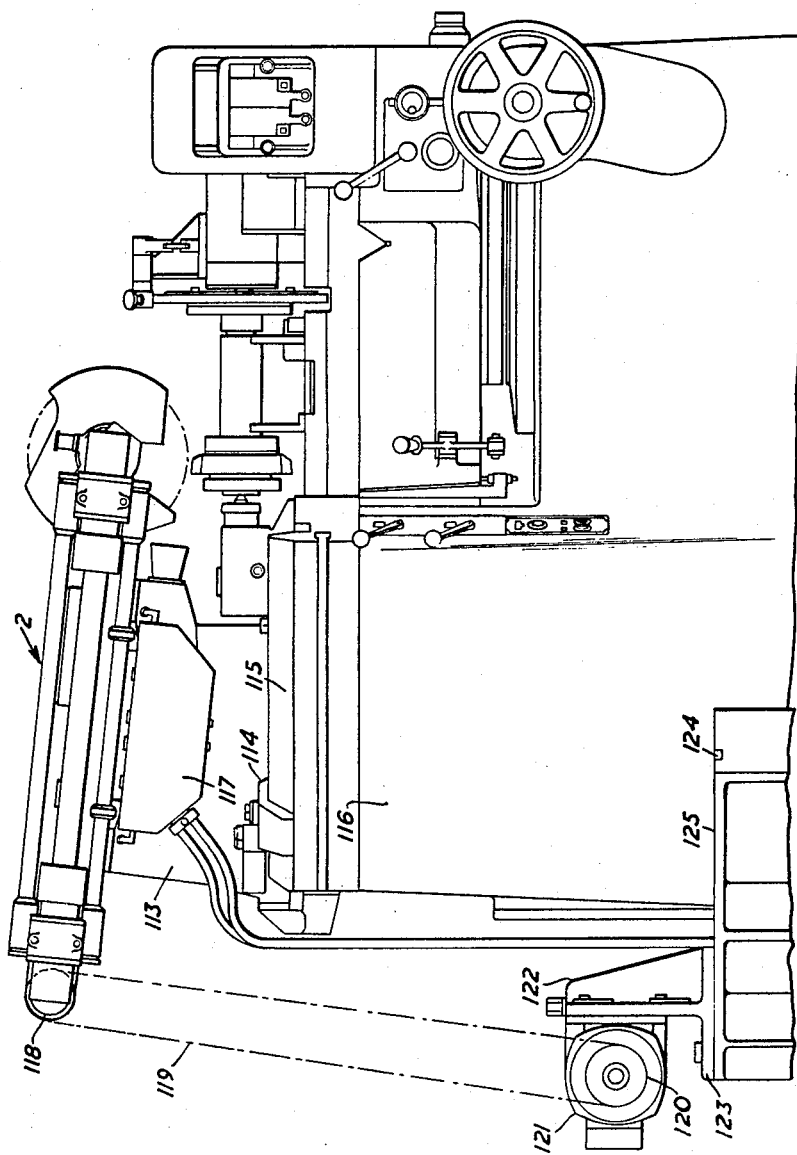
Figure 18:
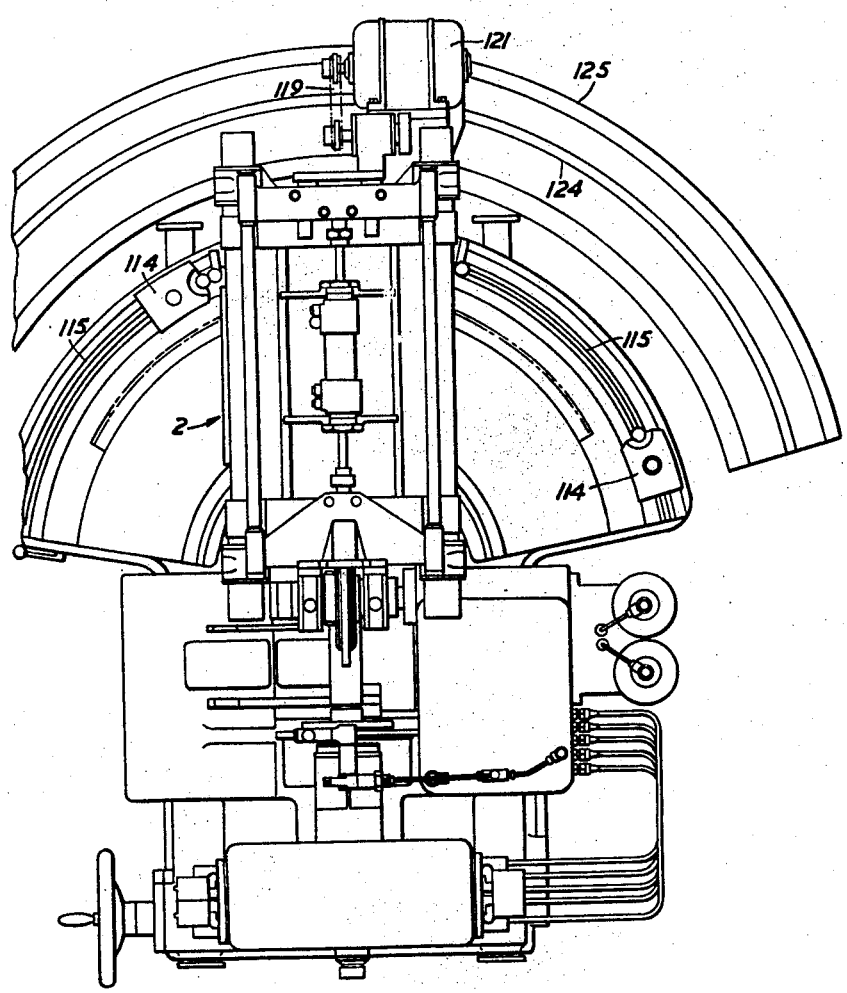

Figure 5 is an elevation in section of the slide head carrying the wheel assembly, Figure 6 is a plan view partly in section of Figure 5, Figure 7 is a section on the line D—E—F in Figure 6, Figure 8 is an elevation partly in section, of a top angle swivel bracket for the wheel assembly, Figure 9 is a side view of Figure 8, Figure 10 is an elevation in section of the cross slide and divide mechanism, Figure 11 is a section on the line B—B of Figure 10, Figure 12 is an elevation partly in section, of the roll through assembly, Figure 13 is a plan view partly in section, of the lower part of Figure 12, Figure 14 is a side elevation partly in section, of Figure 12, Figure 15 is an elevation in section of parts of the saddle of the machine, Figure 16 is a plan of the saddle, in section, Figure 17 is a general view in side elevation of a machine embodying alternative features of construction, and Figure 18 is a plan of Figure 17.

The general assembly of the machine will first be described with reference to Figures 1 and 2 of the drawings and details of certain component parts will be explained in conjunction with the remaining figures of the drawings.

Referring firstly to Figures 1 and 2, the machine is provided with a full form grinding wheel 1 mounted on a reciprocating slide 2 mounted to bring the wheel into engagement with the work 3. The work is carried on a mandrel 4 between dead centres in a tailstock 5 and a roll-through head 6. Division, i.e. accurate spacing of the teeth being ground is effected by a master divide plate 7 (Figure 2) integral or attached to the mandrel 4 and positioned by a ball ended lever or plunger 8. The work 3, the tailstock 5 and the roll-through head 6 are mounted on cross slide 9 and traverse across the plane of the reciprocating grind wheel 1. Attached to the roll-through head 6 is a tape drum 10 (Figure 12) connected by steel tapes 11 to a bracket 12. When the cross-slide 9 is traversed across the grinding wheel 1, the tapes 11, which are held in tension on the drum 10 produce rotary motion of the tape drum 10 imparting a rolling motion through a roll-through arm 13, the plunger 8 and the divide plate 7 to the work 3, such motions combined being the basis of generation of an involute curve.

The feed of the grinding wheel 1 into the work 3 is effected by a vertical screw operated by feed handwheel 14 situated in a saddle 15 and causing this saddle to rise or fall on a column 16. For the grinding of helical gears and cutters an under-slide 17, which carries the reciprocating slide 2 in either a fixed top angle or a variable top angle manner, can be made to swivel to the left or to the right to suit the required helix angle of the gear or cutter. All movements on the machine may be effected and/or controlled by pneumatic, hydraulic, mechanical or any other known and available means.

The grinding wheel head unit of the machine will now be described more fully with reference to Figures 3, 4, 5, 6 and 7. In Figure 3 the grinding wheel 1 is flange mounted on a spindle 18, provision being made for balance weights 20 in one of the two flanges 19 for wheel balancing. The grinding wheel 1 mounted on its flanges 19 is retained on the spindle 18 by a lock-nut 21, the spindle 18 running in micro-clearance bearings 22 in housings 23. Oil seals 24 and a thrust bearing housing 25 retain the lubricating medium. The thrust bearing housing 25 carries a matched pair of preloaded combined journal-thrust bearings 26 end located only to take the end thrust of the grinding wheel 1. Bearing housings 23, carry wick fed oil pipes 27 which protrude into their associated support brackets 28 which also form oil sumps, the bearing housings 23 being retained in position by clips 29 secured by bolts 29a. Oil level windows 28a are provided in the support brackets 28.

It is a useful feature of the mounting means for the grinding wheel head unit that it may easily and quickly be removed for servicing or replacement, by releasing the bolts 29a when the clips 29 can then be removed and the bearing housings 23, with the whole head unit, lifted out of the supporting brackets 28.

Referring now to Figures 5, 6 and 7 the wheel head slide consists of two castings 2a, 2c held together by four steel tube tie bars 30, having suitably drilled connections and forming oil sumps for lubricating the wheel head slide bushes 31. The wheelhead slide reciprocates on hardened and ground guide bars 32 screwed to the base casting 33. Efficient guarding 34 is provided to prevent the ingress of foreign matter into the moving parts. A pneumatic cylinder 35 arranged with a special cushioning device is formed integral with the base casting 33 and attached to each end of wheelhead slide 2 by insulated bushes 36 to further reduce reversal shocks. A motor unit 37 having a balanced stator-rotor is adjustably mounted on guide bars 41 and retained by split cotters 42 to the rear of the wheelhead slide 2 and provides the driving means for the grinding wheel 1 through pulleys 38, 39 and belt 40. The driving motor may be mounted away from the wheelhead for example, on the machine base or special platform and connected by flexible drive or any other means and such remote mounting of the motor relieves the reciprocating slide 2 of the weight of the motor. An example of this alternative method of drive will be described later with reference to Figure 17 of the drawings.

Provision is made on the base casting 33 and the wheelguard 1a for the mounting of a diamond-dressing device for forming the shape of the grinding wheel 1.

The underslide and swivel bracket 17 which carries the reciprocating slide 2 can be arranged either with a fixed top angle setting or variable top angle setting.

The construction providing a variable top angle setting is shown in Figures 8 and 9. The wheelhead slide assembly is carried on two cheeks 46 arranged to swivel on base 47 in the vertical plane. Checks 46 are locked to base 47 by four locking bolts 48 and the top angle setting is indicated on scale 49. Variation of top angle is by a worm 50 rotatable by a shaft 51, the worm being in engagement with a wheel, not shown, but integral with the cheeks 46. This unit complete fits onto the swivel bracket 17. One form of swivel mounting will be described later with reference to the alternative construction shown in Figures 17 and 18.

On one side of the unit are mounted pilot valves 52 operated by trip dogs 53 mounted on the wheelhead slide 2, and which may be positioned in a tie-bar 30 to vary the length of stroke of the wheelhead slide 2. The pilot valves 52 operate reversing valve 54 to change the direction of reciprocation of the wheelhead slide. A speed control valve in the exhaust line gives speed variation of the wheelhead slide reciprocation. Connections between the valves, cylinder and air supply are so arranged that, in the working position, the wheelhead slide has continuous reciprocation and, when shut off, the wheelhead slide will always return to the rear position, that is to say the wheel dressing position. This air supply circuit is also interlocked with the divide plate plunger 8 and can only operate when the plunger 8 is engaged in the divide plate 7.

Referring now to Figures 10 and 11, the cross-slide 9 carries the roll through head and tailstock, and is traversed pneumatically across the plane of the grinding wheel 1 on V and flat surfaces supported on the saddle 15. On the left hand side the member 55 having V and flat surfaces carries the tailstock, only the fragment 5 of which is shown and which is locked in position with a T-bolt. Bellows-type guards 56 are provided to prevent the ingress of foreign matter to the slideways. Lubrication of the slideways is by gravity feed from two integral oil sumps 57 and appropriate drillings 58 into oil grooves in the sliding surfaces. A drain tray 59 with a return to the bed allows for the use of cutting oils. A bracket 60 attached to the cross-slide in line with the tailstock carries a dead centre 61 and rolling bracket 6. The dead centre 61 and shaft 62 are held in position by a locknut 63 with a spacer 64 ground to a specified thickness to allow a pre-determined clearance between the shaft 62 and a rolling bush 65. Rolling bushes 65 and 66 support the rolling bracket 6 and a taper 67 carries a tape drum. The balanced rolling arm 13 is integral with the rolling bracket 6 and carries a lever 68 actuated by a spring 69 and withdrawn by a pneumatic piston 70. The lever 68 transmits motion to the locating lever 8 having either a ball or a plunger, and locks the divide plate 7 in the required position. The divide plate 7 is centralized on a flange 71, an annular expanding bush 72 being provided and the whole is held by a locknut 73 onto the mandrel 4. The expanding bush 72 enables the divide plate 7 to be mounted very accurately with respect to the mandrel 4. The central web of the bush is deformable more or less depending on the degree of tightening of four equally circumferentially spaced bolts 72a passing through it and will compensate for any slackness or play in the main bolts 72b clamping the plate 7 to the flange 71, the bolts 72b having a clearance fit in the divide plate 7. Guards 74 are provided to prevent ingress of foreign matter. The locating lever 8 with advantage can be fitted with a fine adjustment to the ball or plunger for setting purposes.

The tailstock 5 (Figure 1) not shown in full detail, is slidably mounted on an inverted V and flat and is held to the cross-slide 9 by a T-bolt 86 and is a casting having a spring loaded rack operated spindle lapped into it. The spindle can be locked in any position of its travel by split cotters and is withdrawn from the work 3 by a lever on a rack-pinion shaft. A cover and a face seal are provided to prevent the ingress of foreign matter both to the centre and tailstock spindle.

The tape bracket 12 (Figures 1 and 2) will now be described more fully with reference to Figure 12. The bracket, which is slidably mounted on the saddle 15 has a fine adjustment and locking device 75 for use in setting up, and carries tape rolls 76, 76a, 77, a trip bar 78 and pneumatic pilot valves 79 for the control of cross-slide traverse. Two forms of tape mechanism are used: In the form shown on the right hand side of the drawing, what may be described as the straight tape method is used in which the generating circle is that calculated for the tape drum diameter. Steel tapes 11 are clamped between the tape drum 10 and the tape bracket 76, which can be adjusted for height by the vernier scales 89, appropriately graduated, indicating correct positions. The tension of the tape 11 is adjusted by a screw 90. In the second form shown on the left hand side of the drawing, what may be described as the differential tape method is used in which the generating circle is half of that calculated for the tape drum diameter. The steel tapes 11 pass from the tape drum 10 over rollers 76a and 77 to an anchor bracket 80 bolted to the cross-slide. The same setting and tensioning devices are used as in the form first described.

The trip bar 78 carries adjustable trip dogs 81 actuated by a stop 82 mounted on the cross-slide 9. When the stop 82 trips one of the dogs 81 one of the collars 83 causes one of the pilot valves 79 to operate a pneumatic reverse valve 84 and reverses the direction of cross-slide 9. The trip bar 78 is spring returned to its central position when the stop 82 clears the trip dogs 81 on the return stroke. The valves are arranged so that the cross-slide 9 makes one forward and one return stroke for a complete cycle and then stops. The valves are interlocked so that the cross-slide 9 cannot traverse unless the locating plunger 8 is locked into the divide plate 7 and locating plunger 8 cannot be withdrawn from the divide plate when either or both the cross-slide traverse or wheelhead slide are working. Push button valve 84 controls the withdrawal of the locating plunger 8 which will only remain withdrawn whilst the push button 84 is being operated. An adjusting screw 91 serves to move the tape bracket 12 and rolls the cutter in relation to the grinding wheel for setting up purposes.

The saddle 15 as already stated, carries the cross-slide 9, tailstock 5, roll-through head 6 and tape bracket 12, and it houses the feed mechanism and hydro-pneumatic cylinders for effecting the cross-slide traverse. Reference will now be made to Figures 15 and 16 which show the saddle in greater detail. An air cylinder, not shown, and an oil cylinder 100 are connected to the cross-slide 9 through brackets of which one, 101 is shown and the cylinders are controlled by the reversing valve 84 to provide the hydro-pneumatic power for traversing the cross-slide 9. Air in the air cylinder referred to operates against a regulated oil flow in the oil cylinder 100 to ensure an even traverse of the cross-slide 9. A feed screw 102 revolving in a nut 103 in co-operation with a worm 104 a wheel 105 and the handwheel 14 raises or lowers the saddle 15 to or from the wheel 1 on slides 106 and a pillar 107. A graduated dial 108 is provided to indicate increments of feed, and a dead stop 109 operating against a dead stop lever 110 is provided for size repetition and is adjustable on a feed shaft to any desired position, being held by a T-bolt 111. A locking handle 112 locks the saddle in any desired position.

In order to counterbalance the weight of the saddle and the units it carries a pneumatic ram and cylinder assembly, not shown, is preferably mounted in the lower part of the pillar 107 which is provided with a cross-member to take the thrust of the ram or rams employed. An air cylinder for supplying the required air pressure is preferably disposed adjacent the machine.

Referring now to Figures 17 and 18, the machine shown in outline includes alternative features which may be adopted with advantage and also illustrates a convenient method of swivelling the whole grinding head assembly about a vertical axis for the purpose of adjusting the helix angle of the cutter to be formed. The reciprocating slide 2 is supported from a bracket 113 provided with inverted V slides 114 which engage an arcuate inverted V ridge 115 on the fixed column 116. A fixed top angle mounting 117 is provided and the drive to the grinding wheel 1 is by way of a pulley wheel 118, belt 119 and pulley 120 on the shaft of an electric motor 121. The motor is carried on a bracket 122 the base 123 of which is formed with a projection not shown to engage an arcuate groove 124 in an arcuate rail member 125. The mounting of the wheel driving motor 121 remote from the reciprocating slide relieves the latter of weight while the motor mounting enables it to be traversed arcuately to and fro with the reciprocating slide assembly when it is desired to adjust the helix angle of a cutter being formed.

The base of the machine which is not shown in Figure 1 carries the column 16 on which is mounted the saddle 15 with its support pillar 107 and wheelhead units.

I claim:

1. A metal-grinding machine in which there is provided a grinding wheelhead assembly arranged to reciprocate with respect to a workpiece carried by a cross-slide traversable in a horizontal plane with respect to the wheel and in which said workpiece and a divide plate are carried on a common mandrel which is mounted between dead centres, said divide plate being assembled on said mandrel by means which enable accurate registration between the centre of said divide plate and the axis of said mandrel to be achieved.

2. A machine according to claim 1 in which said means enabling said accurate registration to be achieved consists of an expanding bush disposed in an annular aperture between said divide plate and a divide plate mounting member fitted to said mandrel, said bush being engaged by bolts which pass therethrough into said guide plate mounting member.

3. A machine according to claim 2 in which said divide plate mounting member is a plate having a central plate mounting member is a plate having a central tapered bore formed to receive an end of said mandrel which is formed with a corresponding taper, the extremity of said mandrel being screw threaded to receive a lock-nut which secures said divide plate and said mounting plate to said mandrel.

4. A machine according to claim 1 in which position determining means for said divide plate comprise a member shaped releasably to engage and lock in recesses circumferentially spaced around the edge of said divide plate.

5. A machine according to claim 4 in which said divide plate positioning means constitute part of a pivoted assembly arranged to impart a rolling motion to said workpiece said mandrel and said divide plate assembly about the axis of said assembly.

6. A machine according to claim 4 in which said pivoted assembly pivots on a mounting for one of the centres between which the mandrel is mounted.

7. A machine according to claim 5 in which said pivoted assembly is supported in a bracket on said cross-slide and is provided with a tape driven pulley which, on transverse of the cross-slide, produces said rolling motion.

8. A machine according to claim 1 in which said grinding wheelhead assembly includes a slidable mounting incorporating a pneumatic cushioning device arranged to absorb shocks in the longitudinal direction of said slidable mounting.

9. A metal-grinding machine according to claim 1 in which said grinding wheelhead assembly is supported on a base member provided with means for varying the setting of the angle between said grinding wheelhead assembly and the horizontal.

10. A machine according to claim 9 in which said base member supporting the grinding wheelhead assembly is mounted to swivel about a vertical axis passing through the plane of the workpiece.

11. A machine according to claim 10 in which said base member is provided with inverted V surfaces which engage corresponding surfaces of an arcuate track on a column supporting said base member.

12. A machine according to claim 11 provided with a mounting for a motor arranged to drive the grinding wheel via a driving belt and pulley means said motor mounting being arranged to traverse an arcuate track concentric with the arcuate track on said column.

13. A machine according to claim 8 in which said grinding wheel is supported in a bearing assembly, said grinding wheel and bearing assembly forming a unit which is detachably mounted on said slidable mounting for said grinding wheelhead assembly.

14. A metal-grinding machine according to claim 1 in which said grinding wheelhead assembly is carried by a slidable mounting arranged to reciprocate by pneumatic means, said mounting being provided with means serving automatically to effect the reciprocation.

15. A machine according to claim 14 in which, during operation, said mounting reciprocates continuously and on cessation of the supply of working air, said mounting is traversed to the wheel dressing position.

16. A machine according to claim 4 in which said cross-slide is traversed pneumatically across the plane of the grinding wheel and means are provided to ensure that said cross-slide cannot traverse unless said divide plate is locked in position.

17. A machine according to claim 16 in which means are provided to ensure that said locking means for said divide plate cannot be released during traverse of said cross-slide or reciprocation of said grinding wheelhead assembly.

18. A metal-grinding machine according to claim 1 in which said cross-slide is traversed pneumatically across the plane of said grinding wheel and hydropneumatic means are provided to control the traverse of said cross-slide.

19. A machine according to claim 18 in which steady traverse of said cross-slide is produced by providing a regulated flow of liquid opposing an air flow which drives said cross slide.

20. A machine according to claim 18 in which steady traverse of said cross-slide is produced by providing a regulated air flow opposing a liquid flow which drives said cross-slide.

21. A metal-grinding machine according to claim 1 in which a saddle member supporting said cross-slide is raised and lowered with respect to the grinding wheel by mechanical means, the weight of the saddle and parts carried thereby being substantially balanced pneumatically.

References Cited in the file of this patent

UNITED STATES PATENTS

| | | |
|---|---|---|
| 2,022,061 | Tanner | Nov. 26, 1935 |
| 2,187,062 | Sykes | Jan. 16, 1940 |